(12) United States Patent
Horiguchi et al.

(10) Patent No.: US 12,030,488 B2
(45) Date of Patent: Jul. 9, 2024

(54) ELECTRONIC CONTROL DEVICE

(71) Applicant: Hitachi Automotive Systems, Ltd., Hitachinaka (JP)

(72) Inventors: Tatsuya Horiguchi, Tokyo (JP); Teppei Hirotsu, Tokyo (JP); Hideyuki Sakamoto, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 397 days.

(21) Appl. No.: 17/269,768

(22) PCT Filed: Aug. 8, 2019

(86) PCT No.: PCT/JP2019/031316
§ 371 (c)(1),
(2) Date: Feb. 19, 2021

(87) PCT Pub. No.: WO2020/059350
PCT Pub. Date: Mar. 26, 2020

(65) Prior Publication Data
US 2021/0362706 A1    Nov. 25, 2021

(30) Foreign Application Priority Data
Sep. 20, 2018  (JP) ................ 2018-176176

(51) Int. Cl.
*B60W 30/095*   (2012.01)
*B60W 40/04*    (2006.01)
(Continued)

(52) U.S. Cl.
CPC ........ *B60W 30/0956* (2013.01); *B60W 40/04* (2013.01); *B60W 50/0097* (2013.01);
(Continued)

(58) Field of Classification Search
CPC ....... B60W 30/0956; B60W 60/00186; B60W 40/04; B60W 50/0097; B60W 50/023;
(Continued)

(56) References Cited

U.S. PATENT DOCUMENTS

2009/0115242 A1   5/2009  Ohtani et al.
2010/0250051 A1*  9/2010  Nestico .............. G05B 17/02
                                              701/100
(Continued)

FOREIGN PATENT DOCUMENTS

JP   2010-202030 A   9/2010
JP   2010-215234 A   9/2010
(Continued)

OTHER PUBLICATIONS

Nishira et al., Japanese Patent Publication No. JP 2010202030, Published 2010 "translation" (Year: 2010).*
(Continued)

*Primary Examiner* — Hussein Elchanti
(74) *Attorney, Agent, or Firm* — Crowell & Moring LLP

(57) ABSTRACT

The reliability of path planning calculation can be evaluated with low load without using multiplexing of calculation or an additional sensor. The electronic control device includes an integration unit that acquires information around a vehicle as sensor information from a plurality of sensors for each processing cycle, and integrates the acquired sensor information to create vehicle peripheral information for each processing cycle, a path planning unit that calculates a planned path on which the vehicle will travel in the future using the vehicle peripheral information for each processing cycle, and a path evaluation unit that evaluates reliability of the path planning unit, in which the path evaluation unit that uses, in the planned path calculated by the path planning unit in a first processing cycle, a position of the vehicle in a
(Continued)

second processing cycle, which is a processing cycle after the first processing cycle, and the vehicle peripheral information created by the integration unit in the second processing cycle to evaluate the reliability of the path planning unit in the first processing cycle.

11 Claims, 10 Drawing Sheets

(51) Int. Cl.
*B60W 50/00* (2006.01)
*B60W 50/023* (2012.01)
*B60W 50/04* (2006.01)
*B60W 50/14* (2020.01)
*B60W 60/00* (2020.01)

(52) U.S. Cl.
CPC .......... *B60W 50/023* (2013.01); *B60W 50/04* (2013.01); *B60W 50/14* (2013.01); *B60W 60/00186* (2020.02); *B60W 2050/143* (2013.01); *B60W 2554/4041* (2020.02); *B60W 2554/4046* (2020.02)

(58) Field of Classification Search
CPC .............. B60W 50/04; B60W 50/14; B60W 2554/4041; B60W 2554/4046; B60W 2050/143
See application file for complete search history.

(56) References Cited

U.S. PATENT DOCUMENTS

| | | | |
|---|---|---|---|
| 2014/0379254 A1* | 12/2014 | Miksa | G01C 21/30 701/450 |
| 2015/0291177 A1* | 10/2015 | Lee | B60W 40/06 73/146 |
| 2016/0253566 A1* | 9/2016 | Stein | G06T 7/74 348/148 |
| 2016/0356594 A1* | 12/2016 | Sorenson | G08G 1/161 |
| 2017/0088134 A1* | 3/2017 | Liu | G08G 1/165 |
| 2017/0219338 A1* | 8/2017 | Brown | G01S 17/87 |
| 2018/0015801 A1* | 1/2018 | Mohamed | H04L 67/12 |
| 2018/0170374 A1 | 6/2018 | Otsuka et al. | |
| 2018/0283861 A1* | 10/2018 | Kourogi | G01C 5/06 |
| 2019/0084562 A1 | 3/2019 | Schroeder et al. | |
| 2019/0293772 A1* | 9/2019 | Pfeiffer | G05D 1/024 |
| 2021/0362706 A1* | 11/2021 | Horiguchi | B60W 50/0097 |

FOREIGN PATENT DOCUMENTS

| | | |
|---|---|---|
| JP | 2017-47694 A | 3/2017 |
| JP | 2018-95149 A | 6/2018 |
| WO | WO 2017/174408 A1 | 10/2017 |

OTHER PUBLICATIONS

International Search Report (PCT/ISA/210) issued in PCT Application No. PCT/JP2019/031316 dated Dec. 10, 2019 with English translation (four (4) pages).

* cited by examiner

FIG. 8

| | PROCESSING CYCLE N | PROCESSING CYCLE N+1 |
|---|---|---|
| TIME SYNCHRONIZATION PROCESSING UNIT | S1_N<br>S2_N | S1_N+1<br>S2_N+1 |
| SENSOR DATA INTEGRATION UNIT | Aro_N | Aro_N+1 |
| BEHAVIOR PREDICTION UNIT | PreAro_N_N+1<br>PreAro_N_N+2<br>... | PreAro_N+1_N+2<br>PreAro_N+1_N+3<br>... |
| PATH PLANNING UNIT | PrePos_N_N+1<br>PrePos_N_N+2<br>... | PrePos_N+1_N+2<br>PrePos_N+1_N+3<br>... |
| FIRST EVALUATION UNIT | S1_N<br>S2_N<br>--→ PreAro_N-1_N | S1_N+1<br>S2_N+1<br>--→ PreAro_N_N+1 |
| SECOND EVALUATION UNIT | Aro_N<br>--→ PreAro_N-1_N | Aro_N+1<br>--→ PreAro_N_N+1 |
| THIRD EVALUATION UNIT | Aro_N<br>--→ PrePos_N-1_N | Aro_N+1<br>--→ PrePos_N_N+1 |

FIG. 9

| OUTPUT OF SECOND EVALUATION UNIT | OUTPUT OF FIRST EVALUATION UNIT | FIRST ABNORMALITY DETERMINATION RESULT |
|---|---|---|
| MATCH | ONLY TIME SYNCHRONIZATION VALUE OF FIRST SENSOR DOES NOT MATCH | FIRST SENSOR OR TIME SYNCHRONIZATION PROCESSING UNIT IS ABNORMAL |
| MATCH | ONLY TIME SYNCHRONIZATION VALUE OF SECOND SENSOR DOES NOT MATCH | SECOND SENSOR OR TIME SYNCHRONIZATION PROCESSING UNIT IS ABNORMAL |
| MATCH | ONLY PREVIOUS RISK MAP DOES NOT MATCH | SENSOR FUSION PROCESSING IS ABNORMAL |
| MATCH | ALL THREE MATCH | NOT ABNORMAL |
| MATCH | ALL THREE DO NOT MATCH | DETECT ONLY OCCURRENCE OF ABNORMALITY |
| MISMATCH | TIME SYNCHRONIZATION VALUE OF FIRST SENSOR DOES NOT MATCH | FIRST SENSOR OR TIME SYNCHRONIZATION PROCESSING UNIT IS ABNORMAL |
| MISMATCH | TIME SYNCHRONIZATION VALUE OF SECOND SENSOR DOES NOT MATCH | SECOND SENSOR OR TIME SYNCHRONIZATION PROCESSING UNIT IS ABNORMAL |
| MISMATCH | PERIPHERAL OBJECT PREDICTION MAP AT TIME T+1 DOES NOT MATCH | SENSOR FUSION PROCESSING IS ABNORMAL |
| MISMATCH | ALL THREE MATCH | COMPARISON CIRCUIT OR MAJORITY DETERMINATION CIRCUIT IS ABNORMAL |
| MISMATCH | ALL THREE DO NOT MATCH | DETECT ONLY OCCURRENCE OF ABNORMALITY |

FIG. 10

| OUTPUT OF FIRST DETERMINATION UNIT | OUTPUT OF THIRD EVALUATION UNIT | SECOND ABNORMALITY DETERMINATION RESULT |
|---|---|---|
| VEHICLE PERIPHERAL INFORMATION IS NORMAL | MATCH | PATH PLANNING PROCESSING HAS NORMALLY COMPLETED |
|  | MISMATCH | PATH PLANNING PROCESSING IS ABNORMAL |
| VEHICLE PERIPHERAL INFORMATION IS ABNORMAL | MATCH | REFER TO FIRST ABNORMALITY DETERMINATION RESULT |
|  | MISMATCH |  |

ELECTRONIC CONTROL DEVICE

TECHNICAL FIELD

The present invention relates to an electronic control device.

BACKGROUND ART

Toward the realization of an advanced automatic driving system, an automatic driving ECU, which is a higher-level control device that controls automatic driving, is required to continue operation for a certain period of time until the driver takes over the operation even if a failure occurs in the automatic driving system. Examples of such failures include an abnormality that occurs during a calculation on an arithmetic processing unit that performs calculation for automatic driving control, and an abnormality that occurs in a sensor. In order to realize the above-mentioned continuation of operation for a certain period of time, it is necessary to detect these abnormalities and switch to the control corresponding to the abnormalities. In detecting such failures and abnormalities, there are generally a method of multiplexing arithmetic processing and sensors and comparing outputs, and a method of verifying the validity of arithmetic results and sensor output values using different sensor values and arithmetic results. Of these, with regard to multiplexing, there are problems such as large-scale complexity of the system due to an increase in the number of sensors and an increase in an arithmetic load, and a method for verifying validity is required.

Patent Literature 1 discloses an electric booster device including an input member that moves forward and backward by operation of a brake pedal, an assist member that is arranged so as to be relatively movable with respect to the input member, and an electric actuator that moves the assist member forward and backward, in which a brake fluid pressure boosted by an assist thrust applied to the assist member in response to the movement of the input member by the brake pedal is generated in a master cylinder, the electric booster device further including input absolute displacement amount detecting means for detecting an absolute displacement amount of the input member, either one of relative displacement amount detecting means for detecting a relative displacement amount between the input member and the assist member or assist absolute displacement amount detecting means for detecting an absolute displacement amount of the assist member, and control means that sets a target displacement amount in which the relative displacement relationship between the input member and the assist member is variable according to a detection signal of the input absolute displacement amount detecting means, and controls the electric actuator so that the relative displacement relationship between the input member and the assist member becomes the target displacement amount based on a signal from the relative displacement amount detecting means or the assist absolute displacement amount detecting means.

CITATION LIST

Patent Literature

PTL 1: JP 2010-215234 A

SUMMARY OF INVENTION

Technical Problem

In the invention described in Patent Literature 1, the cost of evaluating the reliability of path planning calculation is high.

Solution to Problem

The electronic control device according to the first aspect of the present invention includes an integration unit that acquires information around a vehicle as sensor information from a plurality of sensors for each processing cycle, and integrates the acquired sensor information to create vehicle peripheral information for each processing cycle, a path planning unit that calculates a planned path on which the vehicle will travel in the future using the vehicle peripheral information for each processing cycle, and a path evaluation unit that evaluates reliability of the path planning unit, in which the path evaluation unit uses, in the planned path calculated by the path planning unit in a first processing cycle, a position of the vehicle in a second processing cycle, which is a processing cycle after the first processing cycle, and the vehicle peripheral information created by the integration unit in the second processing cycle to evaluate the reliability of the path planning unit in the first processing cycle.

Advantageous Effects of Invention

According to the present invention, the reliability of path planning calculation can be evaluated with a low load without using multiplexing of calculation or an additional sensor.

BRIEF DESCRIPTION OF DRAWINGS

FIG. 8 is a diagram showing information which a first evaluation unit 121, a second evaluation unit 122, and a third evaluation unit 123 use.

FIG. 9 is a diagram showing determination content of a first determination unit 131.

FIG. 10 is a diagram showing determination content of a second determination unit 132.

DESCRIPTION OF EMBODIMENTS

Embodiment

Hereinafter, embodiments of the electronic control device according to the present invention will be described with reference to FIGS. 1 to 10.

Figure 1:
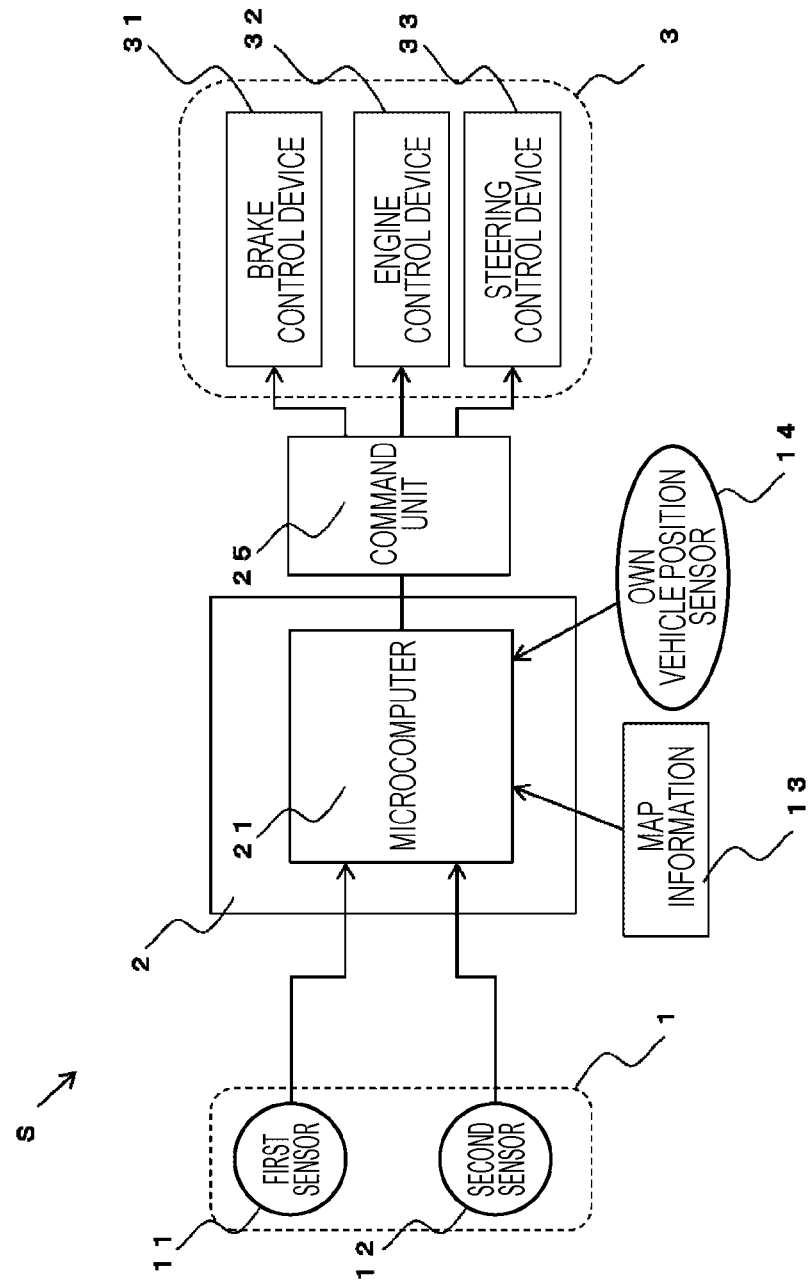
FIG. 1 is an overall configuration diagram of an automatic driving system S.

FIG. 1 is an overall configuration diagram of an automatic driving system S including an electronic control device according to the present invention. The automatic driving system S includes a sensor group 1, an automatic driving ECU 2, a command unit 25, a lower ECU group 3, and an own vehicle position sensor 14. The automatic driving system S is mounted on the vehicle, and hereinafter, the vehicle equipped with the automatic driving system S is referred to as "own vehicle".

The sensor group 1 includes two sensors, and in the present embodiment, the two sensors are referred to as a first sensor 11 and a second sensor 12. These two sensors are, for example, a millimeter-wave radar and a camera. The first sensor 11 and the second sensor 12 acquire information around the own vehicle and output it to the automatic driving ECU 2. Hereinafter, the information around the own vehicle output by the first sensor 11 and the second sensor 12 to the automatic driving ECU 2 is also referred to as "sensor data" or "sensor information". The sensor data includes a time when each sensor acquired the data, in other words, the time when sensing was performed as a time stamp.

The own vehicle position sensor 14 is a sensor that calculates the position of the own vehicle, for example, latitude and longitude. The own vehicle position sensor 14 is, for example, a GPS receiver, receives radio waves from a plurality of satellites constituting a satellite navigation system, and calculates the position of the own vehicle by analyzing signals contained in the radio waves. The own vehicle position sensor 14 outputs the calculated latitude and longitude to the automatic driving ECU 2.

The automatic driving ECU 2 is an electronic control unit. The automatic driving ECU 2 acquires map information 13 and uses it for the calculation described later. The map information 13 may be acquired from a device provided in the own vehicle, or may be acquired by communication from the outside of the own vehicle. The automatic driving ECU 2 reads map information 13 from, for example, a non-volatile memory mounted on the own vehicle, for example, a flash memory.

The automatic driving ECU 2 includes a microcomputer 21, and the microcomputer 21 performs calculations related to the automatic driving of the own vehicle. The microcomputer 21 includes a CPU as a central processing unit, a ROM as a read-only storage device, and a RAM as a readable/writable storage device, and the CPU expands the program stored in the ROM into the RAM and executes it, thereby realizing the functions described later. However, the microcomputer 21 may be realized by FPGA (Field Programmable Gate Array), which is a rewritable logic circuit instead of a combination of CPU, ROM, and RAM, or ASIC (Application Specific Integrated Circuit), which is an integrated circuit for specific applications.

Further, the microcomputer 21 may be realized by a combination of different configurations, for example, a combination of CPU, ROM, RAM and FPGA, instead of a combination of CPU, ROM, and RAM.

For the calculation performed by the microcomputer 21, the information around the own vehicle output by the sensor group 1, the map information 13, and the position of the own vehicle output by the own vehicle position sensor 14 are used. The microcomputer 21 calculates a future path on which the own vehicle travels from now on and outputs it to the command unit 25. The command unit 25 is, for example, an electronic control unit. However, the command unit 25 may be configured to be included in the automatic driving ECU 2. The command unit 25 outputs a specific operation command to each device included in the lower ECU group 3 based on the future path of the own vehicle output by the microcomputer 21.

The lower ECU group 3 controls its own vehicle based on the output of the automatic driving ECU 2. The lower ECU group 3 includes, for example, a brake control device 31 that controls the brake, an engine control device 32 that controls the engine, and a steering control device 33 that controls the steering. Note that the sensor information input from the sensor group 1 to the automatic driving ECU 2 may handle raw data directly output from each sensor or handle data preprocessed by the ECU attached to each sensor.

Figure 2:
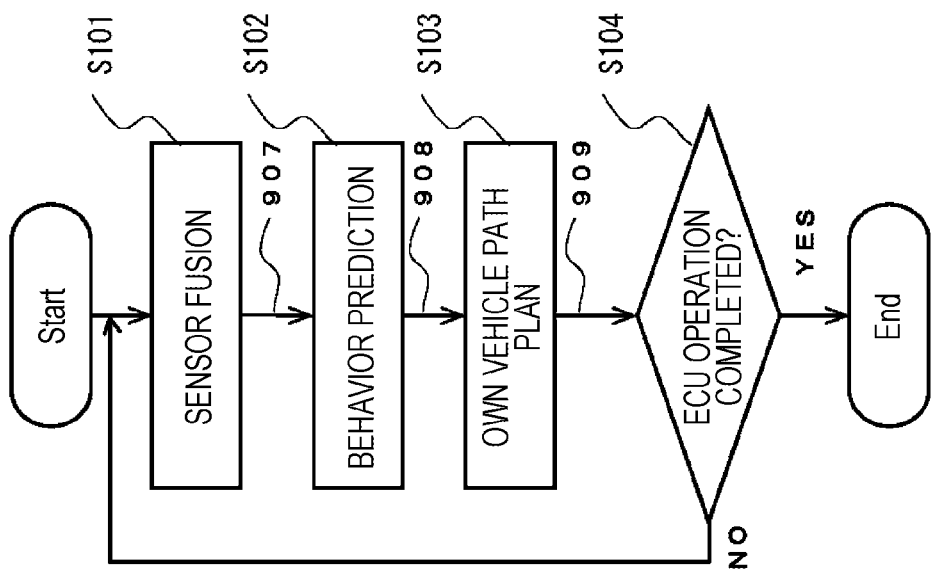
FIG. 2 is a flowchart showing an outline of an automatic driving function realized by a microcomputer 21.

FIG. 2 is a flowchart showing an outline of an automatic driving function realized by the microcomputer 21. First, in step S101, the microcomputer 21 performs a sensor fusion, that is, a process of fusing the output of the first sensor 11 and the output of the second sensor 12. By this sensor fusion processing, vehicle peripheral information 907, which is a peripheral map of the own vehicle, can be obtained.

In the following step S102, the microcomputer 21 uses the map around the own vehicle obtained in step S101 to perform behavior prediction that predicts the behavior of peripheral objects, and creates a risk map 908 described later. Then, in the following step S103, the microcomputer 21 performs the own vehicle path planning to generate the path of the own vehicle using the calculation result of step S102, and generates a planned path 909.

After that, the microcomputer 21 determines whether or not the operation of the automatic driving ECU 2 ends, and if it determines that the operation ends, it ends the process shown in FIG. 2, and if it determines that the operation of the automatic driving ECU 2 does not end, the process returns to step S101. For example, the microcomputer 21 makes a positive determination in step S104 when the ignition switch of the own vehicle is turned off, and makes a negative determination in step S104 in other cases. The microcomputer 21, when making a negative determination in step S104, executes steps S103 to S104 at predetermined processing cycles, for example, every 100 ms. For example, when the processing cycle is 100 ms, the sensor fusion processing of step S101 is performed, and then step S101 is executed again 100 ms later.

Figure 3:
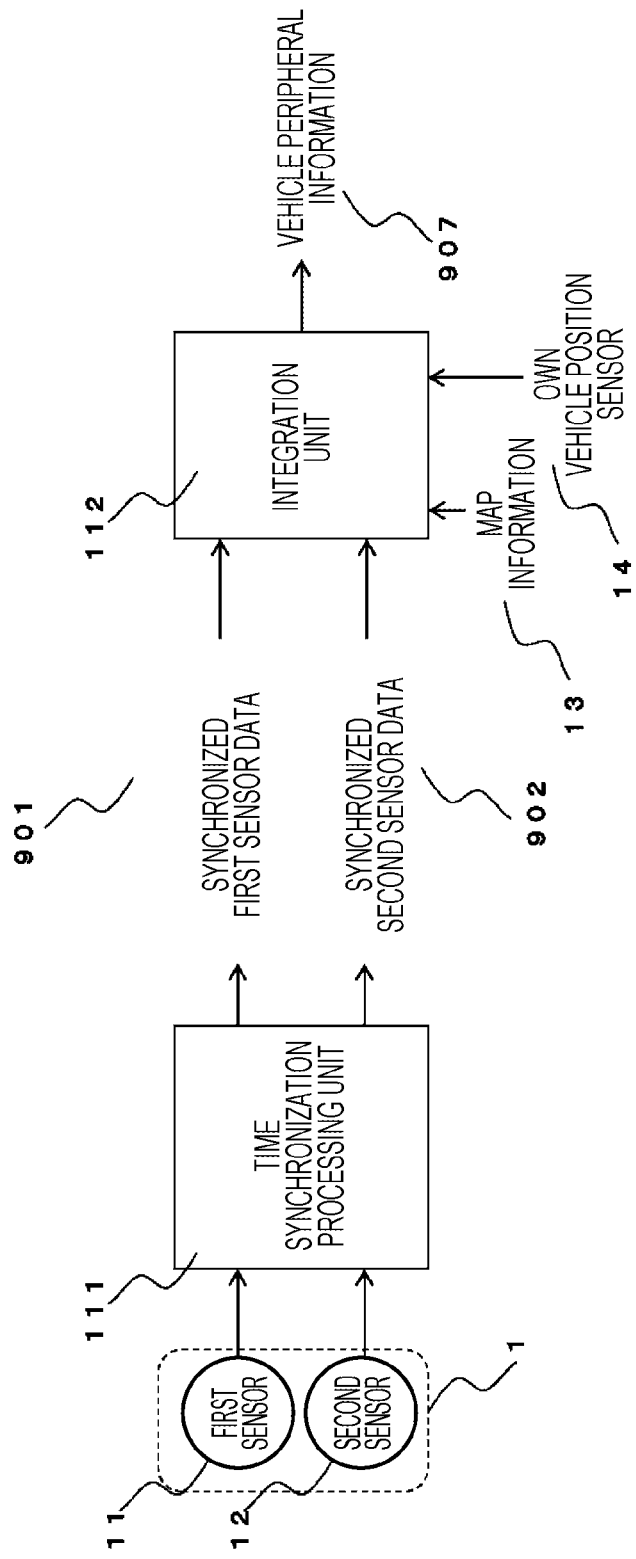
FIG. 3 is a diagram showing an outline of a sensor fusion shown in step S101 of FIG. 2.

FIG. 3 is a diagram showing an outline of the sensor fusion shown in step S101 of FIG. 2. A time synchronization processing unit 111 and an integration unit 112 shown in FIG. 2 are functional blocks indicating the functions realized by the microcomputer 21. In the sensor fusion, first, the time synchronization processing unit 111 executes time synchronization processing. Since sensor data output by the first sensor 11 and the second sensor 12 is not time-synchronized, time synchronization processing 41 generates sensor data at the time synchronized according to the processing cycle.

Specifically, the microcomputer 21 performs extrapolation and interpolation in a time series using time-series sensor data received from the first sensor 11, and outputs synchronized first sensor data 901, which is the sensor data of the first sensor 11 at a predetermined time. Similarly, the microcomputer 21 performs extrapolation and interpolation in time series using time-series sensor data received from the second sensor 12, and outputs synchronized second sensor data 902, which is the sensor data of the second sensor 12 at a predetermined time.

The predetermined time is the time when the processing cycle has elapsed from the time of the previous synchronization. That is, the synchronized first sensor data 901 and the synchronized second sensor data 902 are the sensor data of the first sensor 11 and the second sensor 12 at the same time obtained by calculation. Here, they are simply called "synchronized first sensor data 901" or "synchronized second sensor data 902", but since the surrounding conditions of the own vehicle are changing, the values will be different for each processing cycle. Details will be described later.

The synchronized first sensor data 901, the synchronized second sensor data 902, the map information 13, and the own vehicle position are input to the integration unit 112. The integration unit 112 integrates the synchronized first sensor data 901 and the synchronized second sensor data 902 with the map information 13 to generate vehicle peripheral information 907. The vehicle peripheral information 907 includes not only the positions of objects existing around the own vehicle but also static peripheral information obtained from the map information 13 based on the own vehicle position input by the own vehicle position sensor 14, such as an intersection, pedestrian crossing location, number of lanes, etc.

The position of an object existing around the own vehicle may be calculated and output based on the information obtained by sensing of each of the first sensor 11 and the second sensor 12, or may be calculated by, for example, the time synchronization processing unit 111 of the automatic driving ECU 2 based on the output of each sensor.

(Conceptual Diagram of Vehicle Peripheral Information 907)

Figure 4:
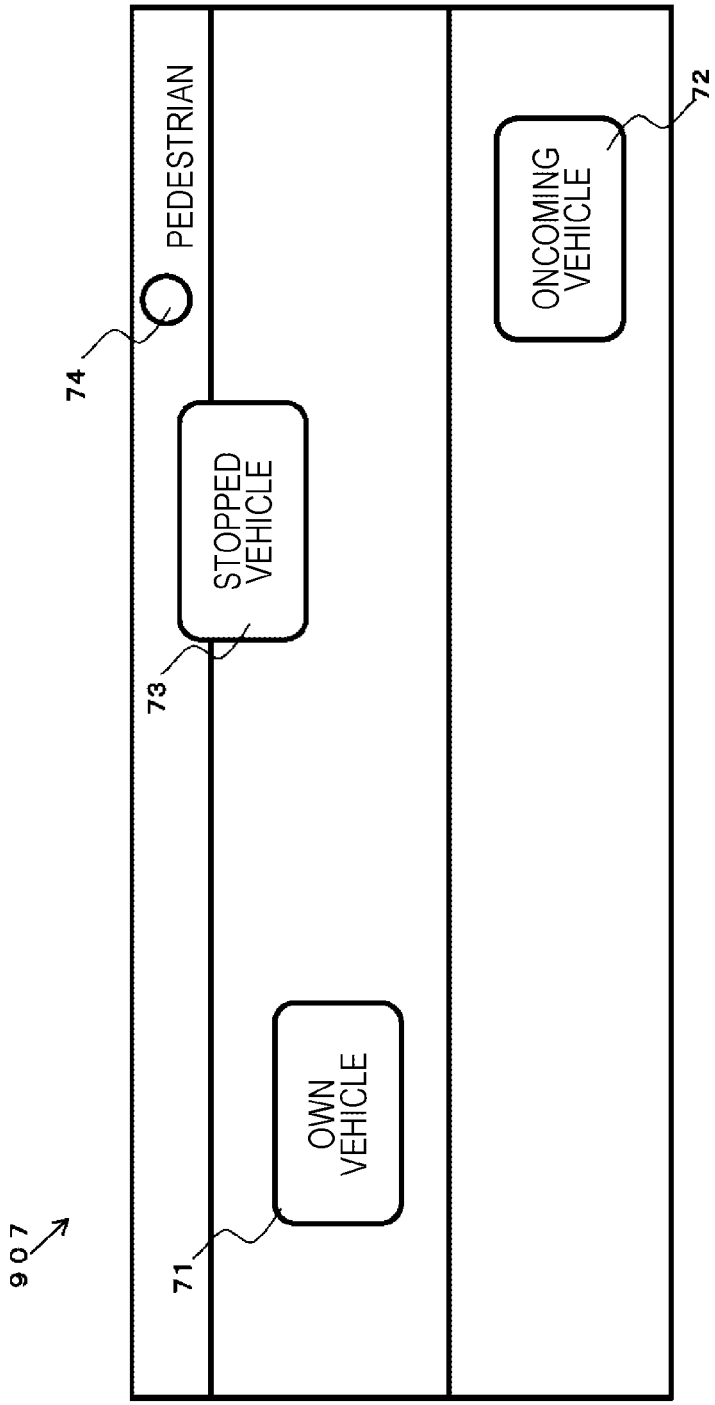
FIG. 4 is a conceptual diagram of vehicle peripheral information 907.

FIG. 4 is a conceptual diagram of the vehicle peripheral information 907. FIG. 4 shows the positions and sizes of objects around the own vehicle detected by the first sensor 11 and the second sensor 12 in addition to the stationary objects around the own vehicle obtained from the map information 13. Specifically, FIG. 4 shows an own vehicle 71, an oncoming vehicle position 72, a stopped vehicle 73, and a pedestrian position 74. Although the own vehicle 71 is shown in FIG. 4 for explanation, the position information of the own vehicle 71 is not included in the vehicle peripheral information 907.

(Conceptual Diagram of Risk Map 908)

Figure 5:
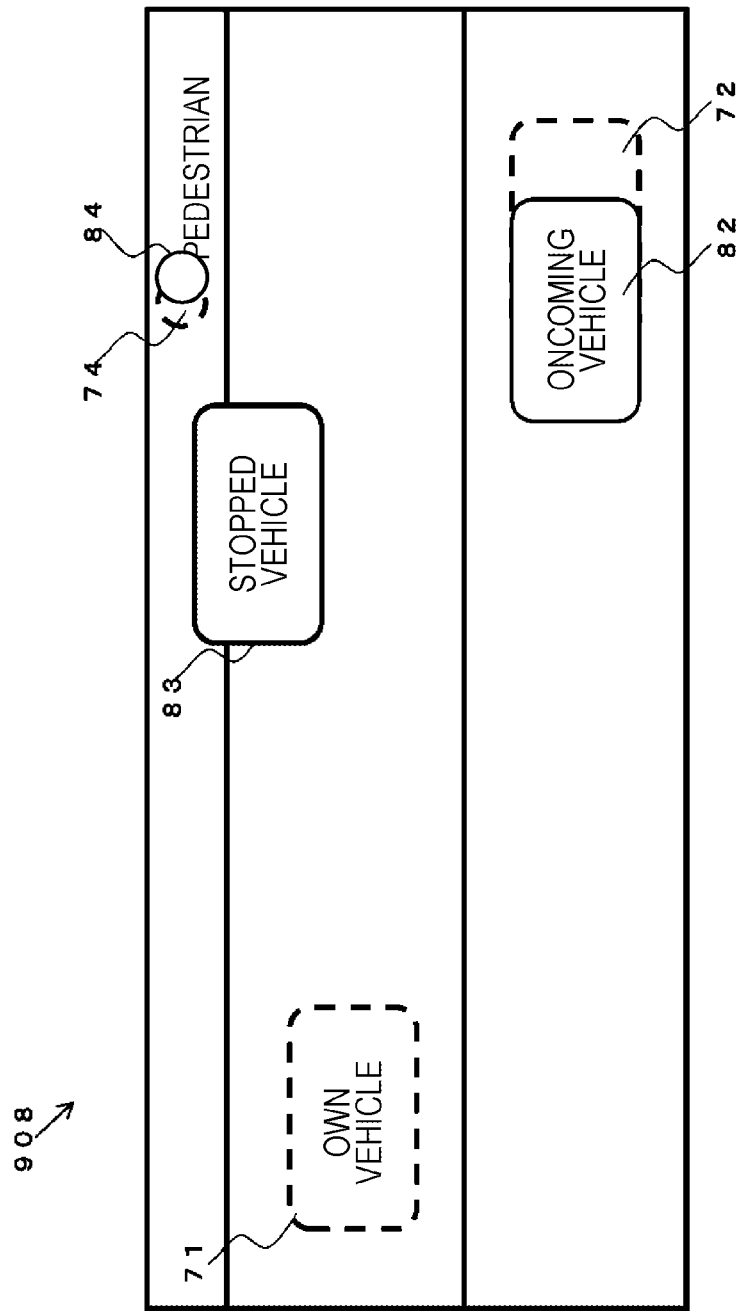
FIG. 5 is a conceptual diagram of a risk map 908.

FIG. 5 is a conceptual diagram of the risk map 908. The risk map 908 is information indicating the positions of objects existing around the own vehicle. As shown in FIG. 5, the risk map 908 includes the predicted positions of an oncoming vehicle predicted position 82, a stopped vehicle predicted position 83, and a walking predicted position 84. However, in FIG. 5, the information of the vehicle peripheral information 907 shown in FIG. 4 is shown by a broken line to help understanding. Further, although FIG. 5 shows only one predicted position of each object, a plurality of predicted positions may be included. The number of predicted positions is, for example, the number required for later path planning processing. For example, in the path planning processing, when the own vehicle path is planned every 100 milliseconds for a period equivalent to 10 seconds ahead, a maximum of 100 predicted positions are generated for each object.

(Conceptual Diagram of Planned Path 909)

Figure 6:
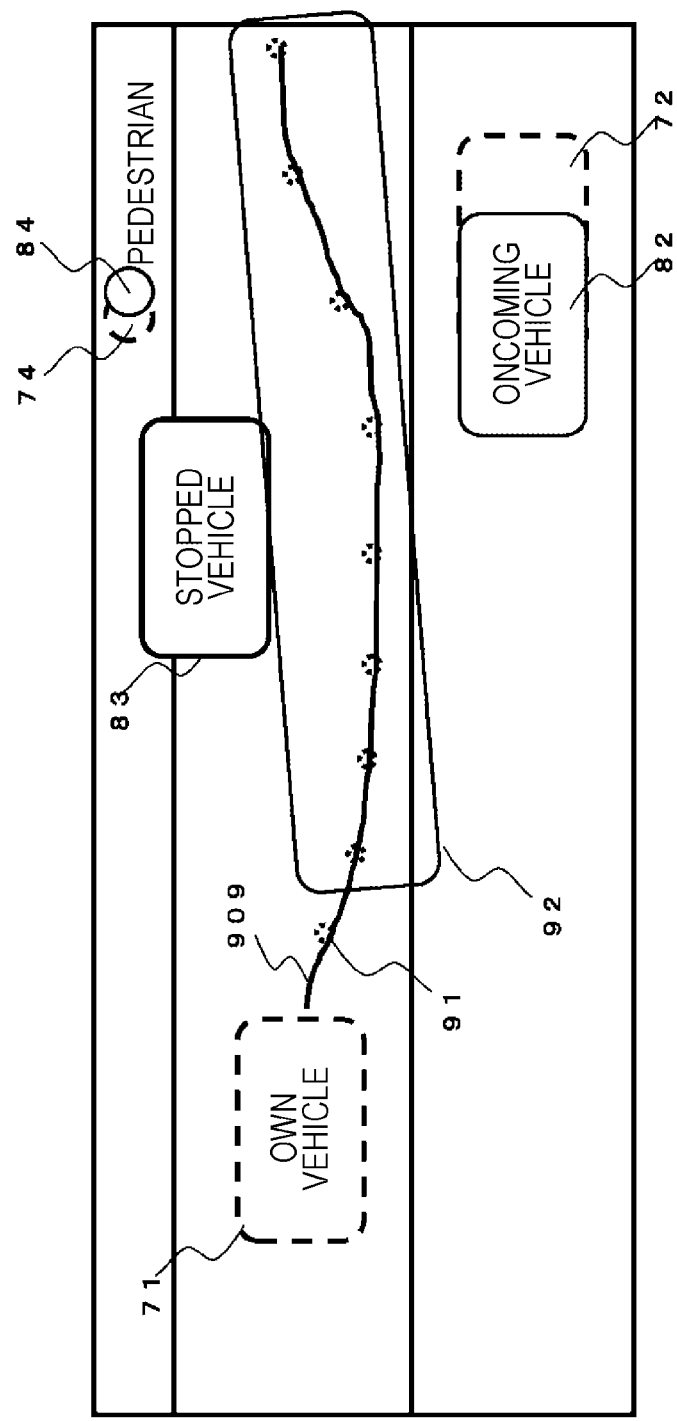
FIG. 6 is a conceptual diagram of a planned path 909.

FIG. 6 is a conceptual diagram of the planned path 909. The planned path 909 is the information shown by the thick solid line in FIG. 6, and is a trajectory on which the own vehicle is planned to travel in the future. The command unit 25 described above calculates the position of the own vehicle for each processing cycle by using the planned path 909 and by further using the information on the speed of the own vehicle and the known processing cycle. For example, the position of the own vehicle in the latest future indicated by reference numeral 91, that is, the position of the own vehicle in the immediate processing cycle, and the position of the own vehicle in the future indicated by reference numeral 92 can also be calculated.

(Functional Block of Microcomputer 21)

Figure 7:
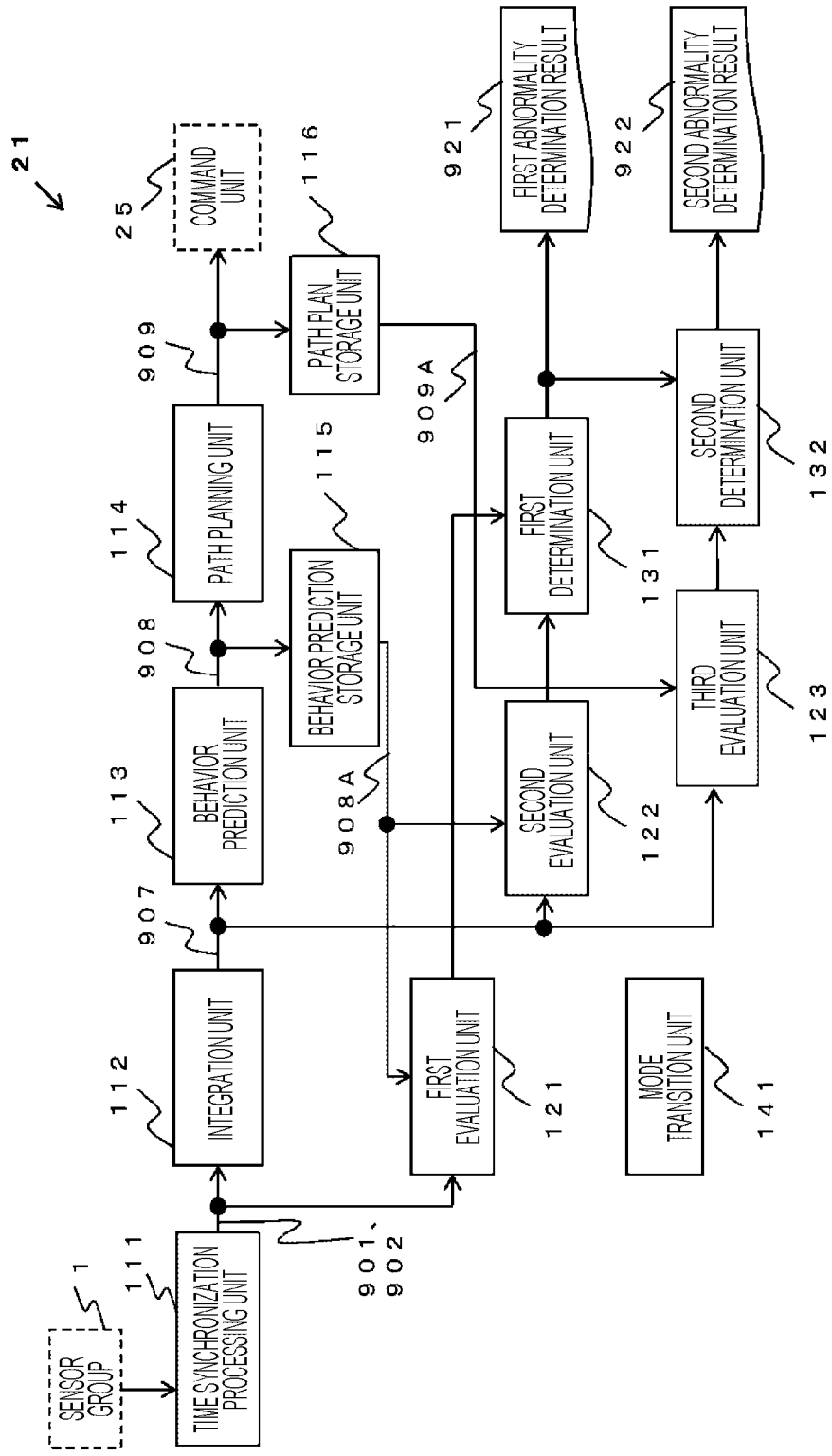
FIG. 7 is a functional block diagram of the microcomputer 21.

FIG. 7 is a functional block diagram showing the functions included in the microcomputer 21. However, since the sensor group 1 and the command unit 25 in the configuration shown in FIG. 7 exist outside the microcomputer 21, they are shown by broken lines. As its functions, the microcomputer 21 includes a time synchronization processing unit 111, an integration unit 112, a behavior prediction unit 113, a path planning unit 114, a behavior prediction storage unit 115, a path plan storage unit 116, a first evaluation unit 121, a second evaluation unit 122, a third evaluation unit 123, a first determination unit 131, a second determination unit 132, and a mode transition unit 141. In the following, the first evaluation unit 121 may be referred to as a prediction evaluation unit, the second evaluation unit 122 may be referred to as an integrated evaluation unit, and the third evaluation unit 123 may be referred to as a path evaluation unit.

In the following, for convenience, an Nth processing cycle is referred to as "processing cycle N", the next processing cycle is referred to as "processing cycle N+1", and the processing cycle immediately before the processing cycle N is referred to as "processing cycle N−1".

The time synchronization processing unit 111 calculates the synchronized first sensor data 901 and the synchronized second sensor data 902 as described with reference to FIG. 3. The time synchronization processing unit 111 outputs both the calculated synchronized first sensor data 901 and the synchronized second sensor data 902 to the integration unit 112 and the first evaluation unit 121. The integration unit 112 calculates the vehicle peripheral information 907 as described with reference to FIG. 3. The integration unit 112 outputs the calculated vehicle peripheral information 907 to the behavior prediction unit 113, the second evaluation unit 122, and the third evaluation unit 123.

The behavior prediction unit 113 predicts the future behavior of objects existing in the vicinity by using the vehicle peripheral information 907, and outputs it as the risk map 908. The behavior prediction unit 113 predicts the behavior for a plurality of future times, and predicts, for example, in the processing cycle N, the position of the object in the processing cycle N+1, the processing cycle N+2, the processing cycle N+3, . . . , and the processing cycle N+10. For example, the behavior prediction unit 113 may accumulate the vehicle peripheral information 907 output from the integration unit 112 and predict the future position of the object from the change in the position in the time series. Further, although not shown, the behavior prediction unit 113 may predict the future position of the object by using the output of the sensor group 1 and using the speed information of the object. Further, the behavior prediction unit 113 may make a detailed prediction by a method such as correcting a route by regarding the interaction between the objects as the repulsive force between the objects. The behavior prediction unit 113 outputs the risk map 908 to the path planning unit 114 and the behavior prediction storage unit 115.

The path planning unit 114 calculates a route that the own vehicle should travel from now on using the risk map 908, in other words, plans the path. The path planning unit 114 may plan the path by referring to the information of a node such as a destination of the own vehicle and an intersection to be reached next. The path planning unit 114 may calculate a path to prevent a collision based on, for example, a distance to a peripheral object, may calculate a path so that the travel time to the destination of the own vehicle is shortened, and further may calculate a path so as to reduce the acceleration that affects the ride comfort of the occupant. The path planned by the path planning unit 114 also includes the position information of the own vehicle in the next processing cycle. The path planning unit 114 outputs the calculated planned path 909 to the command unit 25 and the path plan storage unit 116.

The behavior prediction storage unit 115 temporarily stores the risk map 908 input from the behavior prediction unit 113, and outputs a previous risk map 908A, which is the risk map 908 stored in the previous processing cycle and is created in the previous processing cycle, to the first evaluation unit 121 and the second evaluation unit 122. For example, in the processing cycle N, the behavior prediction storage unit 115 inputs the risk map 908 created in the processing cycle N from the behavior prediction unit 113, and outputs the previous risk map 908A created in the processing cycle N−1. However, although the risk map 908 includes information on the position of the object in a plurality of future processing cycles, it is sufficient that the previous risk map 908A includes information on the position of the object in the processing cycle N. That is, it is sufficient that the previous risk map 908A includes the position of the object in the processing cycle N predicted in the processing cycle N−1. The relationship between the processing cycle and the data will be described in detail later with reference to FIG. 8 below.

The path plan storage unit 116 temporarily stores the planned path 909 input from the path planning unit 114, and outputs a previous planned path 909A created in the previous processing cycle, which is the planned path 909 stored in the previous processing cycle, to the third evaluation unit 123. For example, in the processing cycle N, the path plan storage unit 116 inputs the risk map 908 created in the processing cycle N from the path planning unit 114, and outputs the previous planned path 909A created in the processing cycle N−1. However, although the planned path 909 includes information on the path that is the position of the own vehicle in a plurality of future processing cycles, it is sufficient that the previous planned path 909A includes information on the position of the own vehicle in the processing cycle N. That is, it is sufficient that the previous planned path 909A includes the position information of the own vehicle in the processing cycle N predicted in the processing cycle N−1. The path plan storage unit 116 may calculate the position of the own vehicle in the processing cycle N using the planned path 909, and the third evaluation unit 123 may use the path information to calculate the position of the own vehicle in the processing cycle N.

The first evaluation unit 121 performs evaluation described later using the synchronized first sensor data 901, the synchronized second sensor data 902, and the previous risk map 908A, and outputs the evaluation result to the first determination unit 131. The second evaluation unit 122 performs evaluation described later using the vehicle peripheral information 907 and the previous risk map 808A, and outputs the evaluation result to the first determination unit 131. The third evaluation unit 123 performs evaluation described later using the vehicle peripheral information 907 and the previous planned path 909A, and outputs the evaluation result to the second determination unit 132. The first determination unit 131 makes a determination to be described later using the evaluation result of the first evaluation unit 121 and the evaluation result of the second evaluation unit 122, and outputs a first abnormality determination result 921. The second determination unit 132 makes a determination to be described later using the first abnormality determination result 921 output by the first determination unit 131 and the evaluation result of the third evaluation unit 123, and outputs a second abnormality determination result 922. Before explaining the detailed operation of the first evaluation unit 121 and the like, the time series relationship of the data will be explained again with reference to FIG. 8.

FIG. 8 is a diagram showing information used by the first evaluation unit 121, the second evaluation unit 122, and the third evaluation unit 123. In the example shown in FIG. 8, processing of two processing cycles of the processing cycle N and the processing cycle N+1 is described. The upper half of FIG. 8 shows the outputs of the time synchronization processing unit 111, the integration unit 112, the behavior prediction unit 113, and the path planning unit 114. The lower half of FIG. 8 shows the information used by the first evaluation unit 121, the second evaluation unit 122, and the third evaluation unit 123. However, regarding the information used by the first evaluation unit 121, the second evaluation unit 122, and the third evaluation unit 123, the origin of the information generated in the same processing cycle is not particularly indicated, and the origin is indicated with an arrow only when the information generated in different processing cycles is used. However, in FIG. 8, the description of the behavior prediction storage unit 115 and the path plan storage unit 116 is omitted.

Further, in FIG. 8, the synchronized first sensor data 901 calculated and output in the processing cycle N by the time synchronization processing unit 111 is described as "S1_N", and the synchronized second sensor data 902 output in the processing cycle N is described as "S2_N" If the processing cycle in which calculation is performed is different, "N" is appropriately rewritten accordingly, and for example, the synchronized first sensor data 901 calculated and output in the processing cycle N+1 is described as "S1_N+1". The point that the subscript is changed according to the processing cycle in which calculation is performed is common in the present embodiment, and the description thereof will be omitted below.

In FIG. 8, the vehicle peripheral information 907 calculated by the integration unit 112 in the processing cycle N is described as "Aro_N". In FIG. 8, the risk map 908 in the processing cycle N+1 calculated by the behavior prediction unit 113 in the processing cycle N is described as "PreAro_N_N+1". This description is a combination of "Pre" indicating a prediction, "N" indicating a processing cycle in which calculation is performed, and "N+1" indicating an expected processing cycle. As described above, since the behavior prediction unit 113 also calculates the risk map 908 of the processing cycle N+2 in the processing cycle N, "PreAro_N_N+2" is also shown in FIG. 8. In FIG. 8, the position of the own vehicle in the processing cycle N+1 included in the planned path 909 calculated by the path planning unit 114 in the processing cycle N is described as "PrePos_N_N+1".

In the processing cycle N, S1_N and S2_N, which are the outputs of the time synchronization processing unit 111 in the processing cycle N, and PreAro_N−1_N, which is the output of the behavior prediction unit 113 in the processing cycle N−1, are input to the first evaluation unit 121. In the processing cycle N+1, S1_N+1 and S2_N+1, which are the outputs of the time synchronization processing unit 111 in the processing cycle N+1, and PreAro_N_N+1, which is the output of the behavior prediction unit 113 in the processing cycle N, are input to the first evaluation unit 121.

In the processing cycle N, Aro_N, which is the output of the integration unit 112 in the processing cycle N, and PreAro_N−1_N, which is the output of the behavior prediction unit 113 in the processing cycle N−1, are input to the second evaluation unit 122. In the processing cycle N+1, Aro_N+1, which is the output of the integration unit 112 in the processing cycle N+1, and PreAro_N_N+1, which is the output of the behavior prediction unit 113 in the processing cycle N1, are input to the second evaluation unit 122.

In the processing cycle N, Aro_N, which is the output of the integration unit 112 in the processing cycle N, and PrePos_N−1_N, which is the output of the path planning unit 114 in the processing cycle N−1, are input to the third evaluation unit 123. In the processing cycle N+1, Aro_N+1, which is the output of the integration unit 112 in the processing cycle N+1, and PrePos_N_N+1, which is the output of the path planning unit 114 in the processing cycle N, are input to the third evaluation unit 123.

The operations of the first evaluation unit 121, the second evaluation unit 122, and the third evaluation unit 123 in the processing cycle N will be described.

In the processing cycle N, the first evaluation unit 121 compares S1_N, which is the synchronized first sensor data 901 in the processing cycle N, S2_N, which is the synchronized second sensor data 902 in the processing cycle N, and PreAro_N−1_N, which is the output of the behavior prediction unit 113 in the processing cycle N−1, and detects occurrence of an abnormality and determines the abnormal portion. However, it is inappropriate to perform a strict matching determination in the comparison calculation in the first evaluation unit 121, and if the difference is within a predetermined threshold value, it is determined to match. Therefore, it can be also said that the first evaluation unit 121 evaluates the consistency between S1_N, S2_N, and PreAro_N−1_N.

For example, the first evaluation unit 121 calculates the position of the obstacle included in S1_N, the position of the obstacle included in S2_N, and the center point of the position of the obstacle included in PreAro_N−1_N, and evaluates the distance from the center point. Further, the first evaluation unit 121 may improve the accuracy by weighting the calculation of the center point according to the sensor characteristics such as the relative distance and the angle with the own vehicle. In this way, a matching determination with a range is performed by comparing the obtained distance with the threshold value, and determination by majority vote is performed based on the sensor error.

For example, if the position of the obstacle included in S1_N and the position of the obstacle included in PreAro_N−1_N are almost the same, but the position of the obstacle included in S2_N is significantly different from the other two, the first evaluation unit 121 determines that there is a problem with the output of the second sensor 12 based on the following idea. That is, the true position of the obstacle is not always clear, but a 2:1 majority vote determines that the outputs of S1_N and PreAro_N−1_N are more likely, and there is a problem with S2_N, that is, the output of the second sensor 12.

The first evaluation unit 121 outputs, to the first determination unit 131, the presence/absence of match and information of the specified problem with the output if there is not a match. If the distance from the center is equal to or greater than the threshold value for all three positions, the first evaluation unit 121 cannot specify which one has the problem, and outputs that fact to the first determination unit 131.

In the processing cycle N, the second evaluation unit 122 compares Aro_N, which is the risk map 908 calculated in the processing cycle N, with PreAro_N−1_N, which is the output of the behavior prediction unit 113 calculated in the processing cycle N−1. Specifically, for each object included in Aro_N and PreAro_N−1_N, a matching determination using a predetermined threshold value is performed in the same manner as in the first evaluation unit 121. The second evaluation unit 122 may determine that the objects match as a whole when the number of objects determined to match exceeds the majority of the number of objects, or determine that they match as a whole only when it determines that all the objects match. The second evaluation unit 122 outputs the determination result to the first determination unit 131. It can be also said that the second evaluation unit 122 evaluates the consistency between Aro_N and PreAro_N−1_N.

In the processing cycle N, the third evaluation unit 123 compares Aro_N, which is the risk map 908 calculated in the processing cycle N, with PrePos_N−1_N, which is the position of the own vehicle included in the output of the path planning unit 114 calculated in the processing cycle N−1. In other words, it is evaluated whether or not the own vehicle is controlled according to the planned path 909 planned in the previous processing cycle N−1. This evaluation can be said to be an evaluation of whether the position of the own vehicle and PrePos_N−1_N are consistent. In the evaluation by the third evaluation unit 123, as in the case of the first evaluation unit 121 and the second evaluation unit 122, a matching determination that allows an error is performed using a threshold value. When the two match, the behavior prediction unit 113 evaluates that the own vehicle is controlled according to the planned path 909. The behavior prediction unit 113 outputs the evaluation result to the second determination unit 132.

FIG. 9 is a diagram showing the determination content of the first determination unit 131, that is, the first abnormality determination result 921 output by the first determination unit 131 for each condition. The first determination unit 131 uses the output of the first evaluation unit 121 and the output of the second evaluation unit 122 to detect the presence or absence of abnormality for each of the first sensor 11, the second sensor 12, the integration unit 112, and the behavior prediction unit 113. FIG. 8 shows that the first abnormality determination result 921 is determined according to the combination of the output of the first evaluation unit 121 and the output of the second evaluation unit 122.

The output of the first evaluation unit 121 is the result of a comparison of the synchronized first sensor data 901, the synchronized second sensor data 902, and the previous risk map 908A as described above.

The output of the first evaluation unit 121 is one of the following five cases, that is: only the synchronized first sensor data 901 does not match, only the synchronized second sensor data 902 does not match, only the previous risk map 908A does not match, all three match, and all three do not match. The output of the second evaluation unit 122 is one of the following two cases, that is: the vehicle peripheral information 907 and the previous risk map 908A match, and the vehicle peripheral information 907 and the previous risk map 908A do not match.

If the output of the first evaluation unit 121 indicates that only the synchronized first sensor data 901 does not match, the first abnormality determination result 921 indicates that there is an abnormality in the first sensor 11 or the time synchronization processing unit 111 regardless of the output of the second evaluation unit 122. If the output of the first evaluation unit 121 indicates that only the synchronized second sensor data 902 does not match, the first abnormality determination result 921 indicates that there is an abnormality in the second sensor 12 or the time synchronization processing unit 111 regardless of the output of the second evaluation unit 122. If the output of the first evaluation unit 121 indicates that only the previous risk map 908A does not match, the first abnormality determination result 921 indicates that there is an abnormality in the integration unit 112 regardless of the output of the second evaluation unit 122.

If the output of the first evaluation unit 121 indicates that all three match and the output of the second evaluation unit 122 indicates matching, the first abnormality determination result 921 indicates that there is no abnormality. If the output of the first evaluation unit 121 indicates that all three match and the output of the second evaluation unit 122 indicates mismatch, the first abnormality determination result 921 indicates that there is abnormality in the comparison circuit or the majority circuit. If the output of the first evaluation unit 121 indicates that all three do not match, the first abnormality determination result 921 detects only the occurrence of an abnormality, that is, the abnormality cannot be specified, regardless of the output of the second evaluation unit 122.

FIG. 10 is a diagram showing the determination content of the second determination unit 132, that is, the second abnormality determination result 922 output by the second determination unit 132 for each condition. The second determination unit 132 determines whether or not the vehicle peripheral information 907 is normal, in other words, whether or not it is determined that the sensor fusion processing is abnormal, using the determination result of the first determination unit 131. The second determination unit 132, when determining that the vehicle peripheral information 907 is normal based on the determination result of the first determination unit 131, changes the second abnormality determination result 922 according to the output of the third evaluation unit 123. That is, in this case, if the output of the third evaluation unit 123 indicates matching, the second abnormality determination result 922 indicates that the path planning processing has normally completed, that is, the path planning unit 114 is determined to be normal, and if the output of the third evaluation unit 123 indicates mismatch, the second abnormality determination result 922 indicates that there is an abnormality in the path planning processing, that is, there is an abnormality in the path planning unit 114. The second determination unit 132, when determining that the vehicle peripheral information 907 is not normal, that is, there is an abnormality based on the determination result of the first determination unit 131, refers to the first abnormality determination result 921 regardless of the output of the third evaluation unit 123.

In this way, the second determination unit 132 can use the output of the first determination unit 131 and the output of the third evaluation unit 123 to detect the presence or absence of an abnormality in the path planning unit 114 and its own vehicle control based on it.

When an abnormality is detected in any of the automatic driving ECU 2, the first sensor 11, and the second sensor 12 based on the two results of the first abnormality determination result 921 and the second abnormality determination result 922, the mode transition unit 141 performs processing of transitioning the process in the automatic driving ECU 2 to the degenerate mode. That is, the mode transition unit 141 transitions the own vehicle to the degenerate mode when at least the evaluation result in the third evaluation unit 123 is negative. In the degenerate mode, for example, in the case of a system with a driver, an abnormality notification is given to the driver, control is continued for a certain period of time as necessary, and then control is transferred to the driver. In the degenerate mode, the speed of the own vehicle may be slower than that in the mode other than the degenerate mode, or processing of giving priority to stopping safely over reaching the destination may be performed.

The notification to the driver is executed, for example, by outputting an audio signal to a speaker (not shown) provided in the own vehicle via a communication interface (not shown) provided in the automatic driving ECU 2. The output of the audio signal to the speaker may be executed by the first determination unit 131 and the second determination unit 132 that have detected the abnormality, respectively, or may be executed by a functional block for notifying, for example, a notification unit newly provided.

In the case of a system without a driver, the control method is changed, including functional degradation, in order to continue control on the system. Examples of functional degradation include disconnecting the faulty portion of the microcomputer 21 and continuing control in a state where the control calculation processing is simplified, or invalidating part or all of the recognition results of the first sensor 11 and the second sensor 12. These functional degradation may be performed according to a predetermined method, or may be determined by calculation in the automatic driving ECU 2.

The automatic driving ECU 2 may notify the driver only because the evaluation of the third evaluation unit 123 is negative. This notification may be performed by the third evaluation unit 123, or may be executed by a functional block for performing the notification, for example, a notification unit newly provided.

By the way, it should be noted that in the operation of the microcomputer 21 described above, the vehicle peripheral information 907 calculated in the previous processing cycle has not been verified. For example, the verification of the vehicle peripheral information 907, which is the output of the integration unit 112 calculated in the processing cycle T−1, is not performed in the processing cycle T. That is, in the processing cycle T, the first determination unit 131 and the second determination unit 132 are used to verify the behavior prediction unit 113 and the path planning unit 114 in the processing cycle T−1 which is the previous processing cycle, and verify the integration unit 112 in the processing cycle T, but the vehicle peripheral information 907 in the processing cycle T−1 is not verified, in other words, the integration unit 112 is not verified.

Therefore, with only the above-described configuration, the first sensor 11, the second sensor 12, and the integration unit 112 cannot be verified only in the first processing cycle when the automatic driving is started, and the validity of the subsequent behavior prediction unit 113 and the path planning unit 114 cannot be guaranteed. Therefore, it is necessary to separately verify the validity of the first sensor 11, the second sensor 12, and the integration unit 112 in the first processing cycle.

As a method of this verification, for example, the following processing can be performed as an operation before the start of automatic driving. That is, at a certain time t0 and another time t1, the landmarks around the own vehicle are detected by the processing of the integration unit 112 using the map information 13, and the matching determination is made after adding the movement amount of the own vehicle as necessary. In this way, it is conceivable to verify the validity of the first sensor 11, the second sensor 12, and the integration unit 112 by constructing a temporal multiplex system.

If the validity of these is verified, automatic driving is started at time 1, and if the validity is not verified, that is, if a discrepancy is detected, it is necessary to repeat the same detection until the automatic driving start time specified by the system, and if the detection of mismatch continues, it is necessary to prohibit the start of the automatic driving processing.

With the configuration described above, it is possible to detect an abnormality that occurs in each of the sensor group 1 used in an automatic driving ECU 21 and the integration unit 112 and the behavior prediction unit 113 in the automatic driving ECU 21 without multiplexing. This method is based on the comparison calculation processing using the map or information obtained in the process of the main function processing of the automatic driving ECU, and realizes an electronic control device for automatic driving with low heat generation by simplification of the automatic driving system configuration and reduction of the load of the verification calculation.

According to the embodiments described above, the following operational effects can be obtained.

(1) The automatic driving ECU 21, which is an electronic control device, includes an integration unit 112 that acquires information around the own vehicle as sensor information from a sensor group 1 for each processing cycle, and integrates the acquired sensor information to create vehicle peripheral information 907 for each processing cycle, a path planning unit 114 that calculates a planned path 909 on which the vehicle will travel in the future using the vehicle peripheral information 907 for each processing cycle, and a third evaluation unit 123 (path evaluation unit) that evaluates reliability of the path planning unit. The third evaluation unit 123 uses, in the planned path 909 calculated by the path planning unit 114 in a first processing cycle, a position of the own vehicle in a second processing cycle, which is a processing cycle after the first processing cycle, that is, the planned path 909A, and the vehicle peripheral information 907 created by the integration unit 112 in the second processing cycle to evaluate the reliability of the path planning unit 114 in the first processing cycle. Therefore, the automatic driving ECU 21 can evaluate the reliability of the path planning unit 114 with a low load without using multiplexing of calculation or an additional sensor.

(2) The automatic driving ECU 21 includes a behavior prediction unit 113 that estimates a future position of an object existing around the vehicle based on the vehicle peripheral information 907 in the first processing cycle and creates a risk map 908 showing a position of the object in the second processing cycle, a second evaluation unit 122 (integrated evaluation unit) that evaluates consistency between a previous risk map 908A and the vehicle peripheral information 907 in the second processing cycle, and a first evaluation unit 121 (prediction evaluation unit) that evaluates consistency between the previous risk map 908A and the synchronized first sensor data 901 in the second processing cycle and the synchronized second sensor data 902 in the second processing cycle. Therefore, the reliability of the evaluation target of the third evaluation unit 123 can be confirmed in advance.

(3) The sensor group 1 is composed of the first sensor 11 and the second sensor 12.

The first evaluation unit 121 evaluates reliability by the previous risk map 908A, and a majority vote of the synchronized first sensor data 901 in the second processing cycle and the synchronized second sensor data 902 in the second processing cycle. Therefore, even if sensor information is input from only two sensors, it is possible to determine which one has a problem by majority voting using time-series information.

(4) The automatic driving ECU 2 includes a first determination unit 131 that determines the reliability of the first sensor 11 and the second sensor 12 in the second processing cycle based on the evaluation result of the second evaluation unit 122 and the evaluation result of the first evaluation unit 121. Therefore, the reliability of each sensor information output by the sensor group 1 can be evaluated.

(5) The automatic driving ECU 2 determines the integration unit 112 or the path planning unit 114 to be abnormal when the evaluation result of the third evaluation unit 123 matches a predetermined pattern. Therefore, it is possible to prevent erroneous determination as an abnormality due to the influence of noise or the like, in other words, to prevent over-detection of an abnormality.

(6) The above-mentioned predetermined pattern means that the evaluation result of the third evaluation unit 123 is negative for a predetermined number of times or more in succession. Therefore, the automatic driving ECU 21 can easily determine whether the determination of the third evaluation unit 123 is a predetermined pattern.

(7) Notify the passengers of the own vehicle that the evaluation result of the third evaluation unit 123 is negative. As described above, this notification may be performed by the third evaluation unit 123, or may be performed by a notification unit which is a functional block newly provided.

Modification Example 1

In the above-described embodiment, the path planning unit 114 calculates the path on which the own vehicle will travel in the future.

However, the path planning unit 114 may calculate positions of the own vehicle in respective future processing cycles and output those positions to the lower ECU group 3. In this case, the automatic driving system S does not have to include the command unit 25.

Modification Example 2

In the above-described embodiment, an example of verifying all the processes of the integration unit 112, the behavior prediction unit 113, and the path planning unit 114 without a redundant configuration has been shown, but depending on the processing load and the sensor configuration required for the automatic driving ECU 2 and other system requirements, multiplexing may only be allowed for some sensors and processes. In this case, it is not necessary to provide some evaluation units among the above-described configurations after making the allowable configuration redundant.

For example, if the first sensor 11, the second sensor 12, and the integration unit 112 are allowed to be multiplexed, the first evaluation unit 121 is unnecessary. In this case, the behavior prediction unit 113 can be verified by the second evaluation unit 122 with the vehicle peripheral information 907 output by the integration unit 112 in the processing cycle N as the correct answer. Similarly, when the behavior prediction unit 113 is allowed to be multiplexed, the first evaluation unit 121 is also unnecessary. In this case, the vehicle peripheral information 907 which is the output of the integration unit 112 can be verified by the second evaluation unit 122 with the risk map 908 in the processing cycle N+1, which is output by the behavior prediction unit 113 in the processing cycle N, as the correct answer. If the path planning unit 114 is allowed to be multiplexed, the third evaluation unit 123 is unnecessary.

Modification Example 3

In the above-described embodiment, an example in which the first evaluation unit 121, the second evaluation unit 122, and the third evaluation unit 123 are implemented independently has been shown, but the functions of the first evaluation unit 121, the second evaluation unit 122, and the third evaluation unit 123 may be integrated. That is, as long as the determinations shown in FIGS. 9 and 10 can be made, the function sharing and configuration are not particularly limited.

Modification Example 4

In the above-described embodiment, the abnormal portion is determined by comparing the calculation results in the two processing cycles of the processing cycle N and the processing cycle N+1, which is the cycle next to the processing cycle N. This is just an example, and the abnormality may be determined by comparing the position information, the predicted position information, and the predicted path information over a plurality of times, for example, time T, T+1, and T+2. Further, the processing cycles to be compared do not necessarily have to be continuous. For example, the abnormal portion may be determined by comparing the calculation results in the two processing cycles of the processing cycle N and the processing cycle N+2. Further, an abnormality may be determined by detecting an abnormality over a plurality of times, for example, detecting an abnormality for the same object or location five or more times in succession, or temporal abnormalities due to sensor characteristics, noise, sudden changes in peripheral environmental conditions, or the like may be excluded.

Modification Example 5

Each of the first evaluation unit 121, the second evaluation unit 122, the third evaluation unit 123, the first determination unit 131, and the second determination unit 132 may keep a record when making a negative evaluation or determination. Furthermore, each of the first evaluation unit 121, the second evaluation unit 122, the third evaluation unit 123, the first determination unit 131, and the second determination unit 132, when the evaluation result is negative, may record an evaluation result within a predetermined time before and after a time at which the evaluation result was determined to be negative, for example, one minute before and after the time when the negative evaluation was performed. When the evaluation result is recorded, the time and the input data value may be recorded together.

The negative evaluation is other than positive evaluation. For example, in the first evaluation unit 121, only the case where an output in which all three match indicates a positive evaluation, and the other cases indicate a negative evaluation. In the second evaluation unit 122, match indicates a positive evaluation, and mismatch indicates a negative evaluation. In the third evaluation unit 123, match indicates a positive evaluation, and mismatch indicates a negative evaluation. In the first determination unit 131, the case of no abnormality indicates a positive evaluation, and the other cases indicate a negative evaluation. In the second determination unit 132, normal completion of the path planning processing indicates a positive evaluation, and other than that indicates a negative evaluation.

(8) Each of the first evaluation unit 121, the second evaluation unit 122, the third evaluation unit 123, the first determination unit 131, and the second determination unit 132 records the evaluation result that the evaluation result is negative. Therefore, the record can be confirmed afterward.

(9) Each of the first evaluation unit 121, the second evaluation unit 122, the third evaluation unit 123, the first determination unit 131, and the second determination unit 132, when the evaluation result is negative, records the evaluation result at a predetermined time before and after the time at which the evaluation result is determined to be negative. Therefore, many pieces of information are recorded, which can be useful for subsequent analysis.

The above-described embodiments and modifications may be combined. Moreover, although various embodiments and the modifications are demonstrated above, this invention is not limited to these contents. Each embodiment and various modifications described above are merely examples, and the present invention is not limited to these contents as long as the features of the invention are not impaired. Other embodiments conceivable within the scope of the technical idea of the present invention are also included in the scope of the present invention.

REFERENCE SIGNS LIST 1 sensor group
2 automatic driving ECU
11 first sensor
12 second sensor
14 own vehicle position sensor
21 microcomputer
41 time synchronization processing
45 vehicle peripheral information
111 time synchronization processing unit
112 integration unit
113 behavior prediction unit
114 path planning unit
115 behavior prediction storage unit
116 path plan storage unit
121 first evaluation unit
122 second evaluation unit
123 third evaluation unit
131 first determination unit
132 second determination unit
141 mode transition unit
901 first sensor data
902 second sensor data
907 vehicle peripheral information
908 risk map
908A previous risk map
909 planned path
909A previous planned path

The invention claimed is:
1. An electronic control device comprising:
an integration unit configured to acquire information around a vehicle as sensor information from a plurality of sensors for each processing cycle, and integrate the acquired sensor information to create vehicle peripheral information for each processing cycle;
a path planning unit configured to calculate a planned path on which the vehicle will travel in the future using the vehicle peripheral information for each processing cycle;
a path evaluation unit configured to evaluate reliability of the path planning unit, wherein
the path evaluation unit uses, in the planned path calculated by the path planning unit in a first processing cycle, a position of the vehicle in a second processing cycle, which is a processing cycle after the first processing cycle, and the vehicle peripheral information created by the integration unit in the second processing cycle to evaluate the reliability of the path planning unit in the first processing cycle;
a behavior prediction unit configured to estimate a future position of an object existing around the vehicle based on the vehicle peripheral information in the first pro- cessing cycle and create a risk map showing a position of the object in the second processing cycle;

an integrated evaluation unit configured to evaluate consistency between the risk map and the vehicle peripheral information in the second processing cycle; and a prediction evaluation unit configured to evaluate consistency between the risk map and the sensor information in the second processing cycle, wherein the electronic control device is an automatic driving ECU for an automatic driving system, wherein a lower ECU group controls the vehicles brakes, engine, and steering based on the output from the automatic driving ECU.

2. The electronic control device according to claim 1, wherein the plurality of sensors are composed of a first sensor and a second sensor, and the prediction evaluation unit evaluates reliability by the risk map, and a majority vote of an output of the first sensor in the second processing cycle, and an output of the second sensor in the second processing cycle.

3. The electronic control device according to claim 2, further comprising a first determination unit configured to determine reliability of the first sensor and the second sensor in the second processing cycle based on the evaluation result of the integrated evaluation unit and the evaluation result of the prediction evaluation unit.

4. The electronic control device according to claim 1, wherein the integration unit or the path planning unit is determined to be abnormal when the evaluation result of the path evaluation unit matches a predetermined pattern.

5. The electronic control device according to claim 4, wherein the predetermined pattern means that the evaluation result of the path evaluation unit is negative for a predetermined number of times or more in succession.

6. The electronic control device according to claim 1, further comprising a notification unit configured to notify a passenger of the vehicle that an evaluation result of the path evaluation unit is negative.

7. The electronic control device according to claim 1, wherein the path evaluation unit records the evaluation result that the evaluation result is negative.

8. The electronic control device according to claim 7, wherein the path evaluation unit, when an evaluation result is negative, records the evaluation result at a predetermined time before and after the time when the evaluation result is determined to be negative.

9. The electronic control device according to claim 1, further comprising a mode transition unit configured to transition the vehicle to a degenerate mode when an evaluation result by the path evaluation unit is negative.

10. The electronic control device according to claim 1, wherein reliability of the plurality of sensors and the integration unit is ensured by redundancy.

11. The electronic control device according to claim 1, wherein the plurality of sensors include at least one of a radar and a camera.

* * * * *